United States Patent
Fujiwara

(10) Patent No.: US 8,911,016 B2
(45) Date of Patent: Dec. 16, 2014

(54) SEAT STRUCTURE

(75) Inventor: Hiroyuki Fujiwara, Fucho-cho (JP)

(73) Assignee: Delta Kogyo Co., Ltd. (JP)

( * ) Notice: Subject to any disclaimer, the term of this patent is extended or adjusted under 35 U.S.C. 154(b) by 387 days.

(21) Appl. No.: 13/299,715

(22) Filed: Nov. 18, 2011

(65) Prior Publication Data

US 2012/0146374 A1 Jun. 14, 2012

(30) Foreign Application Priority Data

Dec. 9, 2010 (JP) ................................. 2010-274276

(51) Int. Cl.
*A47C 15/00* (2006.01)

(52) U.S. Cl.
USPC ........... 297/257; 297/233; 297/248; 297/391; 297/396; 297/410; 296/64

(58) Field of Classification Search
CPC ........ B60N 2/02; B60N 2/062; B60N 2/4808; B60N 2/4802; B60N 2/01; B60N 2/065
USPC ......... 297/233, 248, 249, 257, 391, 396, 404, 297/406, 407, 410; 296/64
See application file for complete search history.

(56) References Cited

U.S. PATENT DOCUMENTS

| | | | |
|---|---|---|---|
| 5,611,589 A * | 3/1997 | Fujii et al. | 296/64 |
| 6,076,768 A * | 6/2000 | Durand et al. | 244/118.6 |
| 7,980,617 B2 * | 7/2011 | Brncick et al. | 296/64 |
| 2002/0190550 A1* | 12/2002 | Huang | 297/248 |
| 2004/0084947 A1 | 5/2004 | Demianenko et al. | |
| 2008/0185894 A1* | 8/2008 | Yetukuri et al. | 297/406 |
| 2010/0102585 A1* | 4/2010 | Kato et al. | 296/24.34 |
| 2011/0012386 A1* | 1/2011 | Brncick et al. | 296/64 |
| 2012/0146374 A1* | 6/2012 | Fujiwara | 297/257 |

FOREIGN PATENT DOCUMENTS

JP 11-189082 7/1999

* cited by examiner

*Primary Examiner* — Laurie Cranmer
(74) *Attorney, Agent, or Firm* — Gerald E. Hespos; Michael J. Porco; Matthew T. Hespos

(57) ABSTRACT

A seat structure is configured to allow three passengers to be seated, respectively, in a left seat (1L), a right seat (1R), and a region striding across a boundary between the right and left seats (1R, 1L). The left seat (1L) can be slid leftward to create a walk-through space (S) between the right and left seats (1R, 1L). A headrest (1c) for a middle seat passenger seated between the right and left seats (1R, 1L) is split into right and left split headrests each supported on a top of a seat back of a corresponding seat. The middle seat passenger's left split headrest (1c-L) is moved with the left seat (1L) when sliding the left seat (1L) to allow the right and left seats (1R, 1L) to become spaced apart from each other so as to unblock the walk-through space (S).

6 Claims, 7 Drawing Sheets

SEAT STRUCTURE

BACKGROUND OF THE INVENTION

1. Field of the Invention

The present invention relates to a seat structure capable of creating a walk-through space.

2. Description of the Related Art

Heretofore, there has been known an automobile rear seat 30 having right and left seats 30R, 30L which are separated right and left, as illustrated in FIG. 6A. The terms "right (rightward)" and "left (leftward)" here mean directions on the basis of a seat passenger (this definition will also be applied to the following description).

A headrest 30a for a left seat passenger and a headrest 30b for a right seat passenger are supported on respective tops of the left seat 30L and the right seat 30R. As illustrated in FIG. 6B, one of the right and left seats (in this example, the right seat 30R) is turned after flipping up a seat cushion thereof, so that a walk-through space S is created between the right and left seats 30R, 30L (JP 11-189082A).

The above seat structure requires a lot of time and effort to create the walk-through space S, because it is necessary to perform both the operation of flipping up the seat cushion of the right seat 30R and the operation of turning the right seat 30R. Moreover, although the rear seat 30 is configured to, in a normal mode illustrated in FIG. 6A, allow total three passengers to be seated, respectively, in the left seat 30L, the right seat 30R, and a region striding across a boundary between the right and left seats 30R, 30L, in a side-by-side manner, it is not easy to install a headrest for a middle seat passenger who is seated in the region striding across the boundary between the right and left seats 30R, 30L (middle seat passenger's headrest).

As measures against the above problems, as illustrated in FIGS. 7A and 7B, it is contemplatable that at least one of the right and left seats, for example, the left seat 30L, is slidably moved in a leftward direction L so as to allow the right and left seats 30R, 30L to become spaced apart from each other to create a walk-through space S therebetween. This seat structure requires less time and effort for creating the walk-through space S, because it is only necessary to perform the operation of slidably moving the left seat 30L.

Further, it is contemplatable to install a middle seat passenger's headrest 30c (a headrest 30c for a middle seat passenger who is seated in the region striding across the boundary between the right and left seats 30R, 30L) in such a manner that it is supported on a top a seat back of one of the right and left seats, for example, the left seat 30L.

However, as illustrated in FIG. 7B, when the left seat 30L is slidably moved in the leftward direction L so as to allow the right and left seats 30R, 30L to become spaced apart from each other to create a walk-through space (S) therebetween, the middle seat passenger's headrest 30c is in a position where a right half thereof protrudes into the walk-through space S.

Thus, the middle seat passenger's headrest 30c blocks a passenger from passing through the walk-through space S, so that there remains a need for improving this point.

In view of meeting the above need, it is an object of the present invention to provide a seat structure contrived such that it can be equipped with a middle seat passenger's headrest, while avoiding a situation where the middle seat passenger's headrest blocks a passenger from passing through a walk-through space.

SUMMARY OF THE INVENTION

In order to achieve the above object, the present invention provides a seat structure for a vehicle, which is configured to allow three passengers to be seated side-by-side therein. The seat structure comprises a right seat and a left seat which are separated right and left, and a headrest for a middle seat passenger who is seated in a region striding across a boundary between the right and left seats. At least one of the right and left seats is slidably moved in a rightward-leftward or frontward-rearward direction so as to create a walk-through space between the right and left seats. The middle seat passenger's headrest is composed of a right split headrest and a left split headrest which are arranged in the rightward-leftward direction in a mutually separable manner. The right split headrest and the left split headrest are supported on a top of a seat back of the right seat and a top of a seat back of the left seat, respectively.

Specifically, the present invention is directed to a seat structure comprising a right seat and a left seat which are separated right and left, wherein at least one of the right and left seats is slidably moved in a rightward-leftward or frontward-rearward direction so as to allow the right and left seats to become spaced apart from each other to create a walk-through space therebetween.

In this seat structure, right and left split headrests for a middle seat passenger who is seated in a region striding across a boundary between the right and left seats (middle seat passenger's right and left split headrests) are supported on respective tops of seat backs of the right and left seats, so that the middle seat passenger can use a headrest in the same manner as that for right and left seat passengers.

Then, in an operation of slidably moving at least one of the right and left seats so as to allow the right and left seats to become spaced apart from each other to create a walk-through space therebetween, at least one of the middle seat passenger's right and left split headrests is also moved together with the at least one of the right and left seats. Thus, the seat structure can be equipped with the middle seat passenger's headrest, while avoiding a situation where the middle seat passenger's headrest blocks a passenger from passing through a walk-through space.

In addition, at least one of the middle seat passenger's right and left split headrests is moved together with the at least one of the right and left seats to be moved. Thus, it is not necessary to additionally perform a manual operation of moving the middle seat passenger's headrest to unblock a walk-through space, so that it becomes possible to improve operability so as to create a walk-through space easily and quickly.

In addition, the above advantageous effects can be obtained only by providing the right and left split headrests on respective ones of the tops of the right and left seat backs, so that it becomes possible to facilitate structural simplification and cost reduction.

These and other objects, features and advantages of the invention will become more apparent upon reading the following detailed description along with the accompanying drawings.

BRIEF DESCRIPTION OF THE DRAWINGS

FIGS. 1A and 1B illustrate an automobile rear seat structure according to one embodiment of the present invention, wherein FIG. 1A is a front view of the rear seat structure in a normal mode where no walk-through space is created, and FIG. 1B is a front view of the rear seat structure in a walk-through mode where a walk-through space is created.

FIGS. 4A and 4B illustrate an automobile rear seat structure as an example of a modification of the embodiment, wherein FIG. 4A is a front view of the rear seat structure in a normal mode where no walk-through space is created, and FIG. 4B is a front view of the rear seat structure in a walk-through mode where a walk-through space is created.

FIGS. 6A and 6B illustrate a conventional seat structure, wherein FIG. 6A is a perspective view, and FIG. 6B is a top plan view.

FIGS. 7A and 7B illustrate a conventional seat structure comprising a right seat and a left seat, wherein FIG. 7A is a front view of a state in which the right and left seats are at adjacent positions, and FIG. 7B is a front view of a state in which the left seat is slidably moved in a leftward direction to create a walk-through space.

DETAILED DESCRIPTION OF THE PREFERRED EMBODIMENTS

Figure 1A:
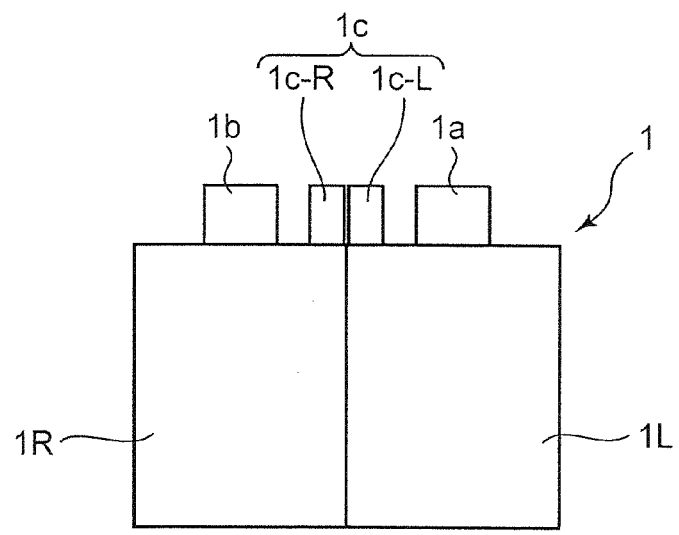
Figure 1B:
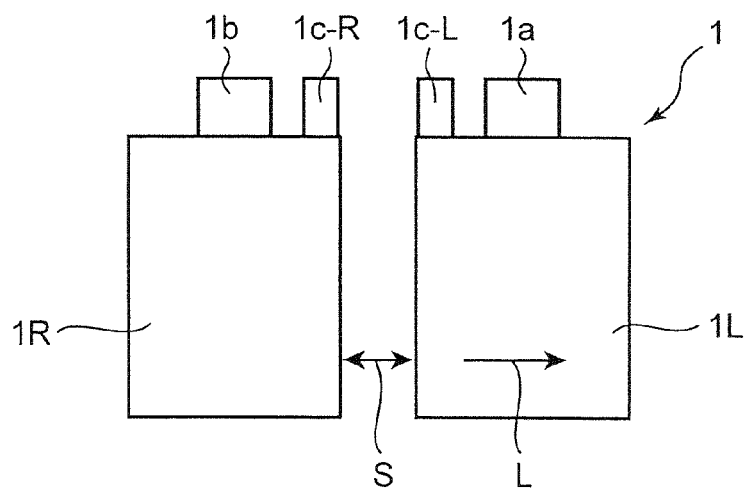

With reference to the drawings, the present invention will now be specifically described based on an embodiment thereof. FIGS. 1A and 1B illustrate an automobile rear seat structure 1 according to one embodiment of the present invention, wherein FIG. 1A is a front view of the rear seat structure in a normal mode where no walk-through space is created, and FIG. 1B is a front view of the rear seat structure in a walk-through mode where a walk-through space S is created.

The rear seat structure 1 comprises a right seat 1R and a left seat 1L which are separated right and left, for example, at a split ratio of 5:5. The rear seat structure 1 is configured to, in the normal mode, allow total three passengers to be seated, respectively, in the left seat 1L, the right seat 1R, and a region striding across a boundary between the right and left seats 1R, 1L, in a side-by-side manner.

A headrest 1a for a left seat passenger (left seat passenger's headrest 1a) and a headrest 1b for a right seat passenger (right seat passenger's headrest 1b) are supported on respective tops of the left seat 1L and the right seat 1R. Further, a headrest 1c for a middle seat passenger who is seated in a region striding across a boundary between the right and left seats 1R, 1L (middle seat passenger's headrest 1c) is split approximately equally into two right and left portions. The two split headrests (the right split headrest 1c-R and the left split headrest 1c-L) are supported on respective tops of seat backs of the right and left seats (1R, 1L).

Then, as illustrated in FIG. 1B, one of the right and left seats 1R, 1L (in this embodiment, the left seat 1L) is slidably moved from a position illustrated in FIG. 1A in a leftward direction L, so that the right and left seats 1R, 1L become spaced apart from each other to create a walk-through space S therebetween.

In this embodiment, as illustrated in FIG. 1B, the right and left split headrests (1c-R, 1c-L) formed as two approximately equal halves of the middle seat passenger's headrest 1c are supported on the top of the right seat 1R and the top of the left seat 1L, respectively. Thus, in the operation of slidably moving the left seat 1L to allow the right and left seats 1R, 1L to become spaced apart from each other, the left split headrest 1c-L is moved together with the left seat 1L to allow the walk-through space S to be created without being blocked by the middle seat passenger's headrest 1c.

Figure 2:
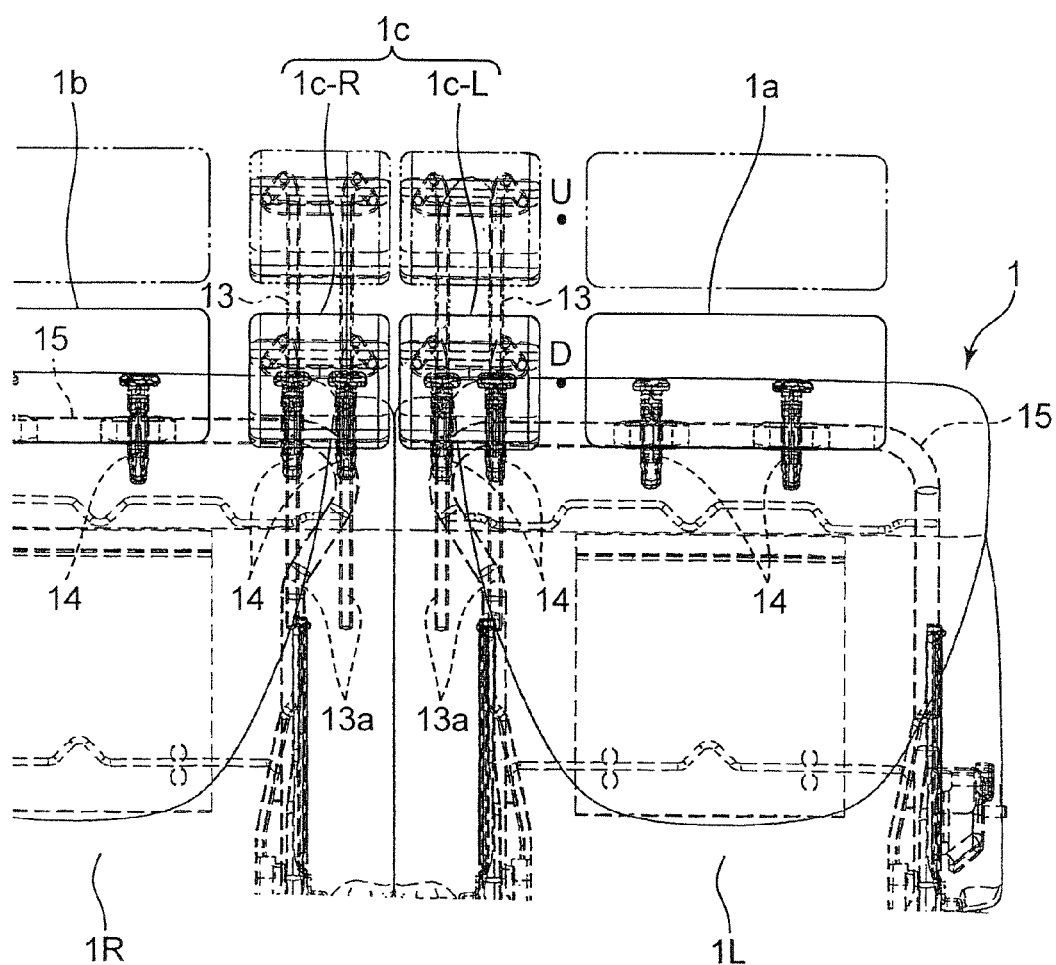
FIG. 2 is a fragmentary front view of the rear seat structure.
Figure 3:
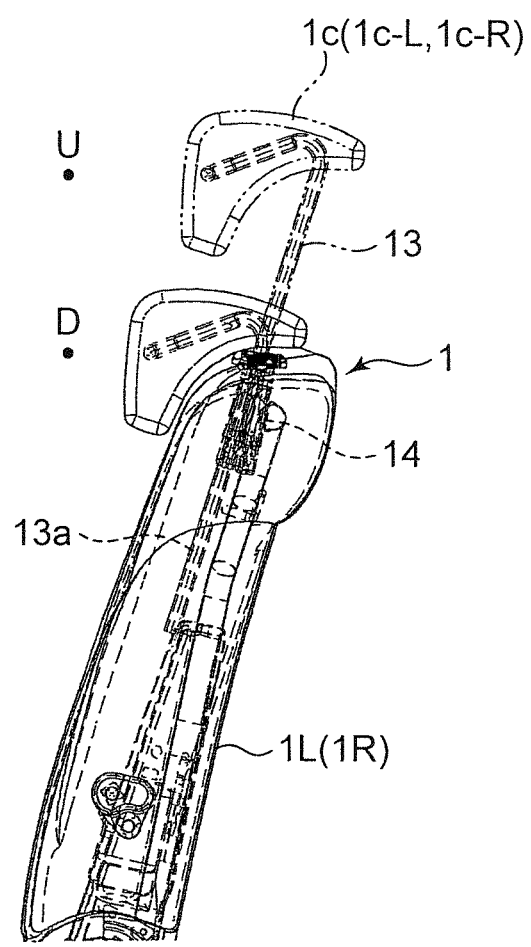
FIG. 3 is a side view of the rear seat structure in FIG. 2.

A specific structure of the middle seat passenger's headrest 1c will be described below. FIG. 2 is a fragmentary front view of the rear seat structure 1, and FIG. 3 is a side view of the rear seat structure in FIG. 2.

The left split headrest 1c-L of the left seat 1L is mounted to a pole 13 having a pair of right and left leg portions 13a. Further, a pair of right and left pole guides 14 are provided inside a right shoulder region of an upper portion of the left seat 1L and fixed to an upper portion of a back frame 15. The leg portions 13a of the pole 13 are supported by respective ones of the pole guides 14 in a liftable and lowerable manner.

Based on the above structure, a height position of the left split headrest 1c-L can be adjusted between a lowest position D and a highest position U. Although not specifically illustrated, the left split headrest 1c-L is provided with a locking mechanism for selectively locking the left split headrest 1c-L in the lowest position D, the highest position U, and an appropriate position between the lowest position D and the highest position U.

In the same manner, the right split headrest 1c-R is supported by a pole 13 and a pair of right and left pole guides 14 in a liftable and lowerable manner, and provided with the same locking mechanism.

Each of the left seat passenger's headrest 1a and the right seat passenger's headrest 1b is also supported by a pole (not illustrated) and a pair of right and left pole guides 14 in a liftable and lowerable manner, and provided with the same locking mechanism.

In the automobile rear seat structure 1 constructed as above, in a normal mode, the left seat 1L is set in a position adjacent to the right seat 1R, as illustrated in FIG. 1A. In the normal mode, as illustrated in FIGS. 1A and 2, the middle seat passenger's headrest 1c (1c-R, 1c-L) is held in a position where it can be used by a middle seat passenger who is seated in the region striding across the boundary between the right and left seats 1R, 1L.

Then, in the operation of slidingly moving the left seat 1L from the position illustrated in FIG. 1A in the leftward direction L so as to allow the right and left seats 1R, 1L to become spaced apart from each other to create a walk-through space S therebetween as illustrated in FIG. 1B, the middle seat passenger's left split headrest 1c-L is also moved together with the left seat lL. Thus, the rear seat structure 1 can be equipped with the middle seat passenger's headrest 1c (1c-R, 1c-L), while avoiding a situation where the middle seat passenger's headrest blocks a passenger from passing through the walk-through space S.

The middle seat passenger's left split headrest 1c-L is moved together with the left seat lL. Thus, it is not necessary to additionally perform a manual operation of moving the middle seat passenger's headrest to unblock a walk-through space, so that it becomes possible to improve operability so as to create a walk-through space easily and quickly.

In addition, the above advantageous effects can be obtained only by providing the right and left split headrests 1c-R, 1c-L on respective ones of the tops of the seat backs of the right and left seats 1R, 1L, so that it becomes possible to facilitate structural simplification and cost reduction.

Further, the middle seat passenger's right and left split headrests 1c-R, 1c-L are supported on respective ones of the tops of the seat backs of the right and left seats 1R, 1L in an independently liftable and lowerable manner, so that it becomes possible to adjust a height position of the middle seat passenger's headrest 1c (1c-R, 1c-L).

Figure 4A:
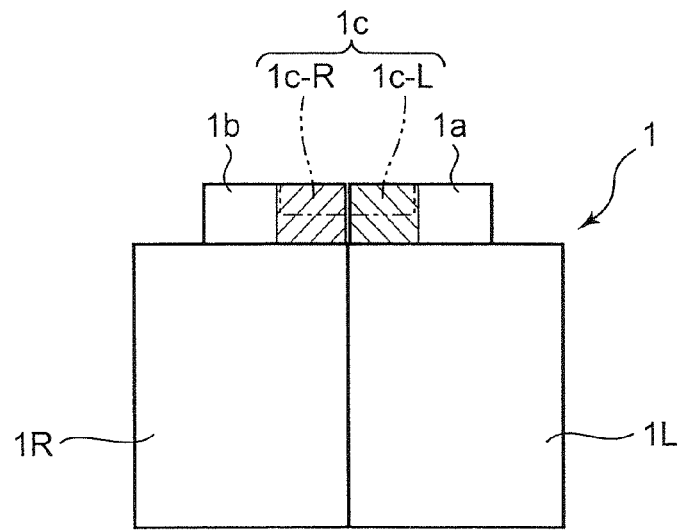
Figure 4B:
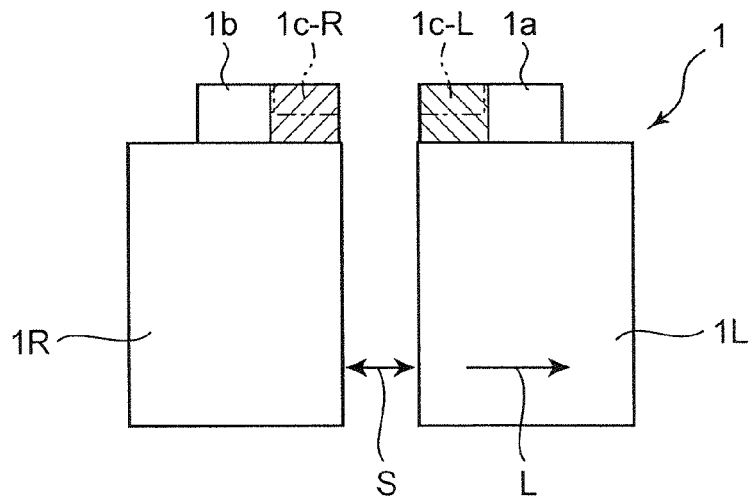

In the above embodiment, each of the middle seat passenger's right split headrest 1c-R and the middle seat passenger's left split headrest 1c-L is formed separate from a respective one of the right seat passenger's headrest 1b of the right seat 1R and the left seat passenger's headrest 1a of the left seat 1L. Alternatively, as illustrated in FIGS. 4A and 4B, the middle seat passenger's left split headrest 1c-L (indicated by hatching) may be integrated with the left seat passenger's headrest 1a of the left seat 1L in an extended manner on a right side thereof, and the middle seat passenger's right split headrest 1c-R (indicated by hatching) may be integrated with the right seat passenger's headrest 1b of the right seat 1R in an extended manner on a left side thereof. In this case, when there is a need for ensuring rearward visibility, each of the middle seat passenger's right and left split headrests 1c-R, 1c-L may be lowered with respect to a respective one of the right seat passenger's and left seat passenger's headrests 1b, 1a.

As above, each of the right and left split headrests 1c-R, 1c-L can be provided only by extending a respective one of the right seat passenger's and left seat passenger's headrests 1b, 1a of the right and left seats 1R, 1L in the rightward-leftward direction, so that it becomes possible to further facilitate structural simplification and cost reduction. In addition, the pole and pole guides for lifting and lowering each of the right seat passenger's and left seat passenger's headrests 1b, 1a can also be used as those for lifting and lowering a respective one of the right and left split headrests 1c-R, 1c-L. On this point, it becomes possible to further facilitate structural simplification and cost reduction.

Figure 5A:
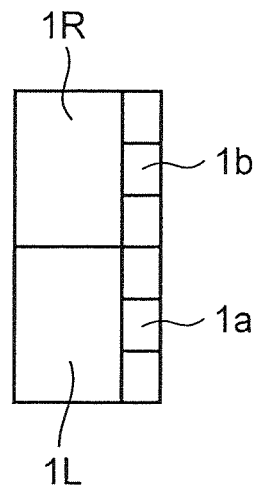
FIGS. 5A and 5B are top plan views of a seat structure of a type in which one of two seats is slidably moved in a rearward direction to create a walk-through space.
Figure 5B:
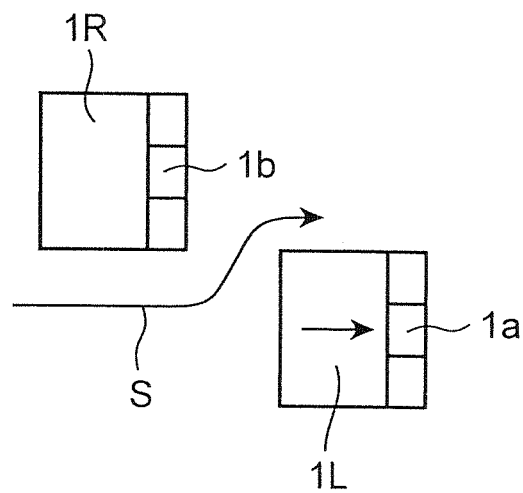

The rear seat structure according to the above embodiment is designed such that the left seat 1L is slidably moved in the leftward direction L so as to allow the right and left seats 1R, 1L to become spaced apart from each other to create a walk-through space S therebetween. Alternatively, the present invention may also be applied to a seat structure in which the left seat 1L is slidably moved in a rearward direction as to allow the right and left seats 1R, 1L to become spaced apart from each other to create a walk-through space S therebetween, as illustrated in FIGS. 5A and 5B.

Figure 5C:
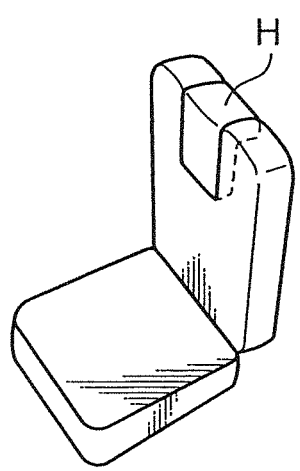
FIGS. 5C and 5D are explanatory diagrams of a saddle type headrest.
Figure 5D:
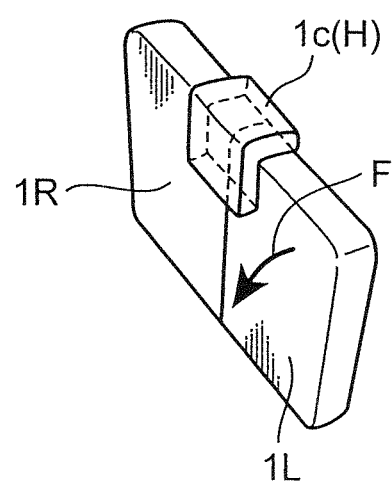
Figure 6A:
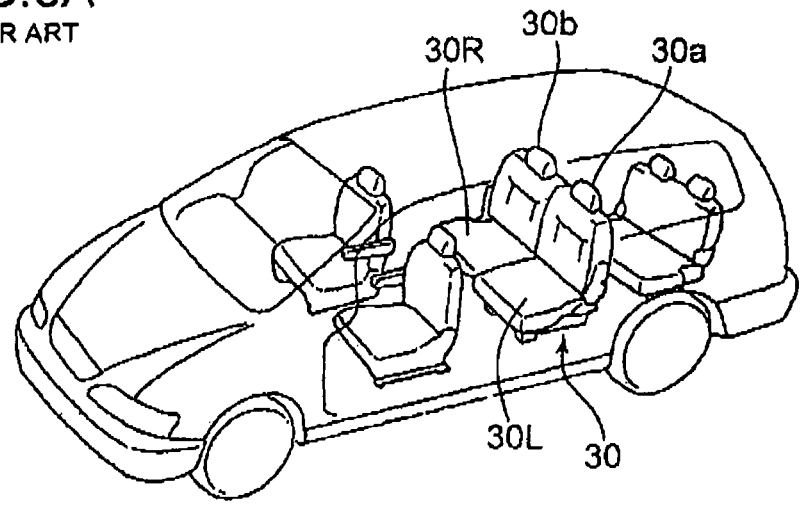
Figure 6B:
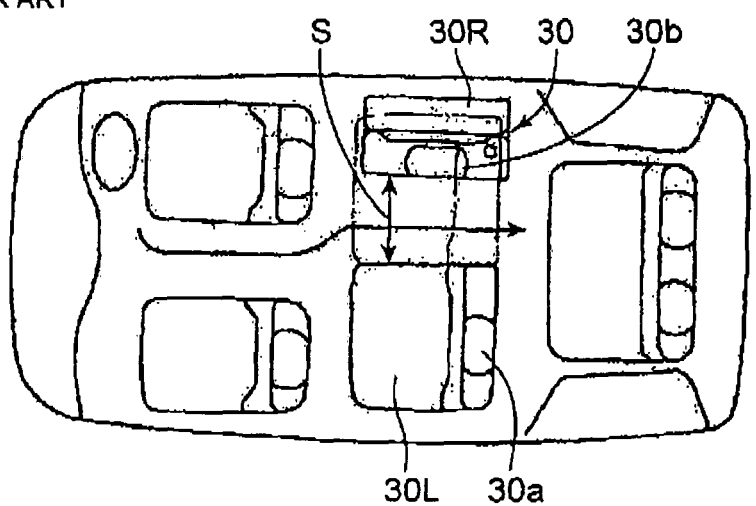
Figure 7A:
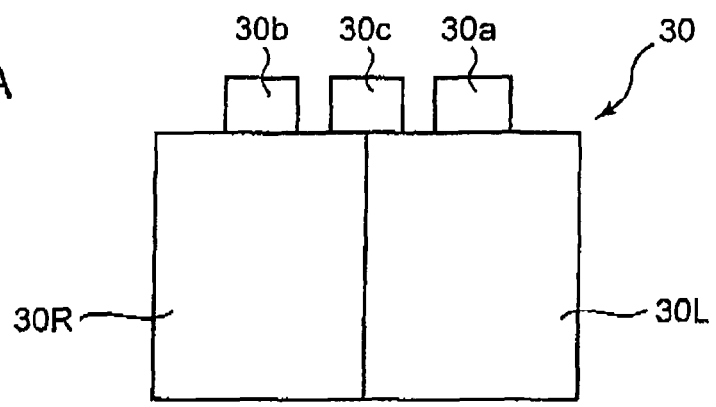
Figure 7B:
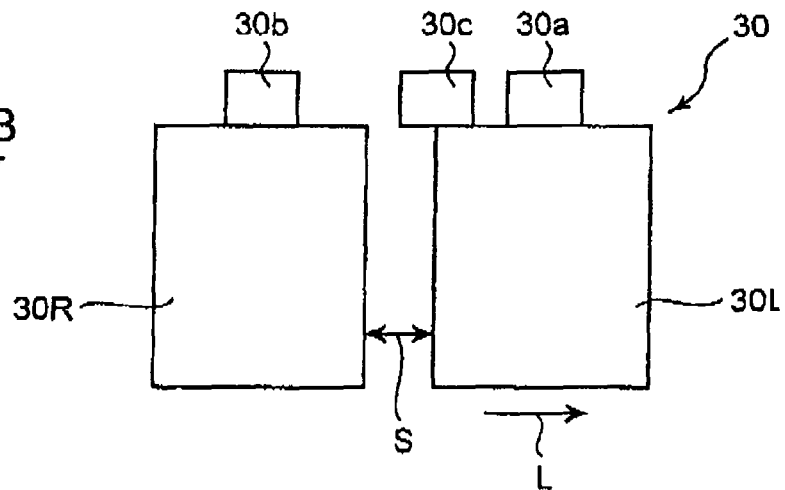

Meanwhile, as illustrated in FIG. 5C, there has been known a saddle type headrest H having a generally inverted-L shape in side view, wherein the headrest H is adapted to be sunk into an upper portion of a seat back. It is contemplatable that such a saddle type headrest H is applied to a headrest 1c for a middle seat passenger who is seated in a region striding across a boundary between right and left seats 1R, 1L. In this case, assuming that the headrest 1c is supported, for example, by a seatback of the right seat 1R, even if a passenger tries to incline a seat back of the left seat 1L frontwardly, the seat back of the left seat 1L will be caught on the headrest 1c and precluded from being inclined frontwardly. In contract, even if the middle seat passenger's headrest 1c in the above embodiment is formed as the saddle type, each of the seat backs of the right and left seats 1R, 1L can be inclined frontwardly without any problem, because the middle seat passenger's headrest 1c is split into the right and left portions (1c-R, 1c-L).

[Outline of the Above Embodiments]

The present invention provides a seat structure (1) for a vehicle, which is configured to allow three passengers to be seated side-by-side therein. The seat structure comprises: a right seat (1R) and a left seat (1L) which are separated right and left; and a headrest (1c) for a middle seat passenger who is seated in a region striding across a boundary between the right and left seats. At least one of the right and left seats is slidably moved in a rightward-leftward or frontward-rearward direction so as to create a walk-through space (S) between the right and left seats. The middle seat passenger's headrest (1c) is composed of a right split headrest (1c-R) and a left split headrest (1c-L) which are arranged in the rightward-leftward direction in a mutually separable manner. The right split headrest (1c-R) and the left split headrest (1c-L) are supported on a top of a seat back of the right seat (1R) and a top of a seat back of the left seat (1L), respectively.

Specifically, the present invention is directed to a seat structure comprising a right seat and a left seat which are separated right and left, wherein at least one of the right and left seats is slidably moved in a rightward-leftward or frontward-rearward direction so as to allow the right and left seats to become spaced apart from each other to create a walk-through space therebetween.

In this seat structure, right and left split headrests for a middle seat passenger who is seated in a region striding across a boundary between the right and left seats (middle seat passenger's right and left split headrests) are supported on respective tops of seat backs of the right and left seats, so that the middle seat passenger can use a headrest in the same manner as that for right and left seat passengers.

Then, in an operation of slidably moving at least one of the right and left seats so as to allow the right and left seats to become spaced apart from each other to create a walk-through space therebetween, at least one of the middle seat passenger's right and left split headrests is also moved together with the at least one of the right and left seats. Thus, the seat structure can be equipped with the middle seat passenger's headrest, while avoiding a situation where the middle seat passenger's headrest blocks a passenger from passing through a walk-through space.

At least one of the middle seat passenger's right and left split headrests is moved together with the at least one of the right and left seats to be moved. Thus, it is not necessary to additionally perform a manual operation of moving the middle seat passenger's headrest to unblock a walk-through space, so that it becomes possible to improve operability so as to create a walk-through space easily and quickly.

In addition, the above advantageous effects can be obtained only by providing the right and left split headrests on respective ones of the tops of the right and left seat backs, so that it becomes possible to facilitate structural simplification and cost reduction.

The right and left split headrests (1c-R, 1c-L) for the middle seat passenger may be supported on respective ones of the tops of the seat backs (1a, 1b) of the right and left seats in an independently liftable and lowerable manner. Further, the seat structure may be implemented as the following two embodiments.

In one embodiment, when the right seat and the left seat are provided with a right seat passenger's headrest and a left seat passenger's headrest, respectively, the right and left split headrests (1c-R, 1c-L) for the middle seat passenger may be integrated with the right seat passenger's and left seat passenger's headrests, respectively.

In accordance with this embodiment, each of the right and left split headrests can be provided only by extending a respective one of the right seat passenger's and left seat passenger's headrests in the rightward-leftward direction, so that it becomes possible to further facilitate structural simplification and cost reduction. In addition, a pole and a pole guide for lifting and lowering each of the right seat passenger's and left seat passenger's headrests can also be used as those for lifting and lowering a respective one of the right and left split headrests. On this point, it becomes possible to further facilitate structural simplification and cost reduction.

In the other embodiment, when the right seat and the left seat are provided with a right seat passenger's headrest and a left seat passenger's headrest, respectively, each of the right and left split headrests (1c-R, 1c-L) for the middle seat passenger is capable of adjusting a height position thereof, independently of a respective one of the right seat passenger's and left seat passenger's headrests.

In accordance with this embodiment, each of the right and left split headrests (1c-R, 1c-L) for the middle seat passenger is supported in a liftable and lowerable manner, independently of a respective one of the right seat passenger's and left seat passenger's headrests, so that a height position of the middle seat passenger's headrest can be adjusted in conformity to a physique of the middle seat passenger, which makes it possible to provide better seating and riding comfort to the middle seat passenger.

This application is based on Japanese Patent Application Serial No. 2010-274276, filed in Japan Patent Office on Dec. 9, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A seat structure for a vehicle, configured to allow three passengers to be seated side-by-side therein, comprising:
    a right seat and a left seat which are separated right and left; and
    a headrest for a middle seat passenger who is seated in a region striding across a boundary between the right and left seats,
    wherein:
    at least one of the right and left seats is slidably moved in a rightward-leftward or frontward-rearward direction so as to create a walk-through space between the right and left seats; and
    the middle seat passenger's headrest is composed of a right split headrest and a left split headrest which are arranged in the rightward-leftward direction in a mutually separable manner, the right split headrest and the left split headrest being supported on a top of a seat back of the right seat and a top of a seat back of the left seat, respectively.

2. The seat structure as defined in claim 1, wherein the right and left split headrests for the middle seat passenger are supported on respective ones of the tops of the seat backs of the right and left seats in an independently liftable and lowerable manner.

3. The seat structure as defined in claim 2, wherein the right seat and the left seat are provided with a right seat passenger's headrest and a left seat passenger's headrest, respectively, and wherein the right and left split headrests for the middle seat passenger are integrated with the right seat passenger's and left seat passenger's headrests, respectively.

4. The seat structure as defined in claim 2, wherein the right seat and the left seat are provided with a right seat passenger's headrest and a left seat passenger's headrest, respectively, and wherein each of the right and left split headrests for the middle seat passenger is capable of adjusting a height position thereof, independently of a respective one of the right seat passenger's and left seat passenger's headrests.

5. The seat structure as defined in claim 1, wherein the right seat and the left seat are provided with a right seat passenger's headrest and a left seat passenger's headrest, respectively, and wherein the right and left split headrests for the middle seat passenger are integrated with the right seat passenger's and left seat passenger's headrests, respectively.

6. The seat structure as defined in claim 1, wherein the right seat and the left seat are provided with a right seat passenger's headrest and a left seat passenger's headrest, respectively, and wherein each of the right and left split headrests for the middle seat passenger is capable of adjusting a height position thereof, independently of a respective one of the right seat passenger's and left seat passenger's headrests.

* * * * *